March 14, 1950     J. W. ANDERSON, JR     2,500,784
REAR VIEW MIRROR
Filed Dec. 30, 1948
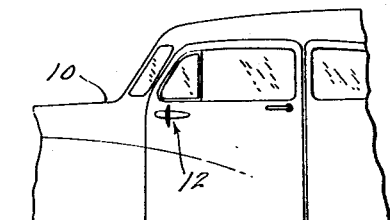
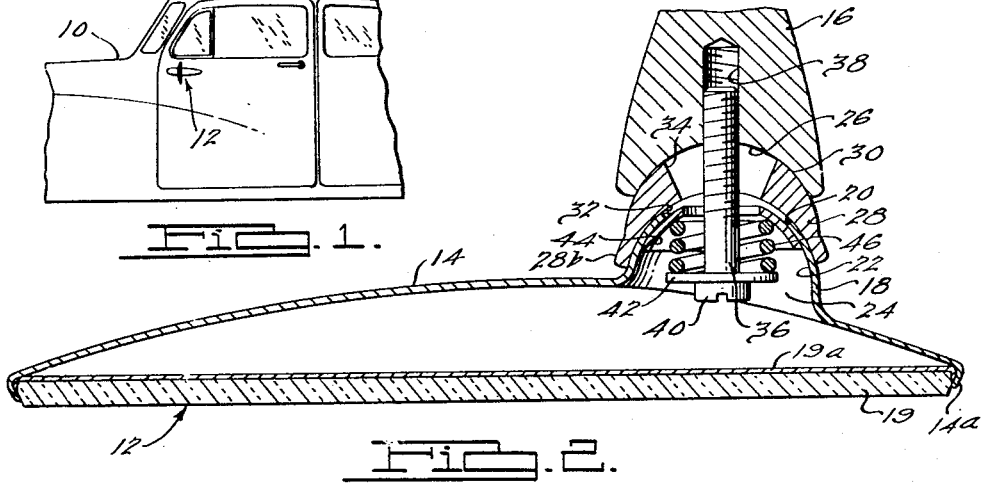
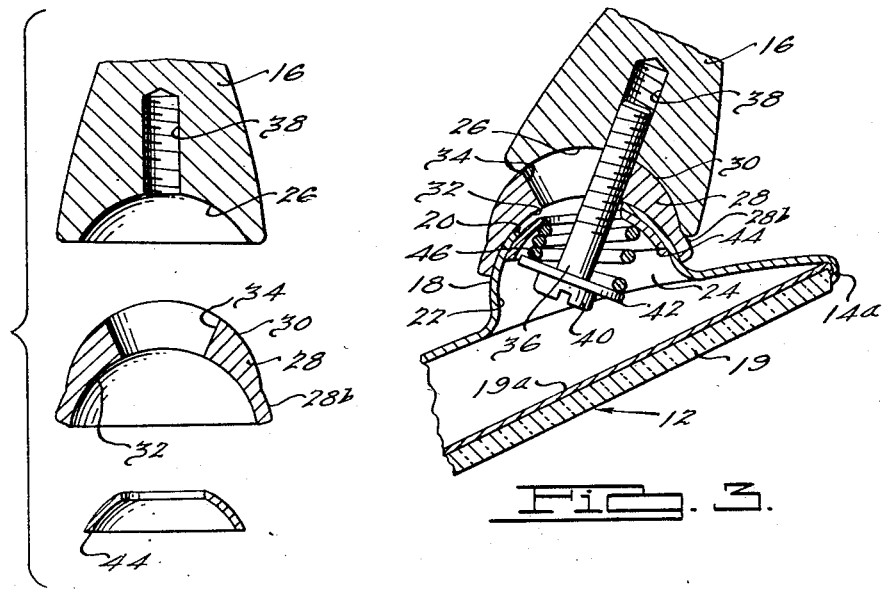
INVENTOR.
James W. Anderson, Jr.
BY
Elmer Jamison Gray
ATTORNEY.

Patented Mar. 14, 1950

2,500,784

UNITED STATES PATENT OFFICE 2,500,784

REARVIEW MIRROR

James W. Anderson, Jr., Detroit, Mich.

Application December 30, 1948, Serial No. 68,189

6 Claims. (Cl. 287—23)

The present invention relates to adjustable rear view mirrors for automobile bodies and the like and particularly to an improved construction for rear view mirrors of the type in which a mirror head comprising a glass mirror mounted within a shell or backing is adjustably attached by means of a ball and socket joint to the outer end of a supporting arm or bracket which in turn is attached to the exterior of the automobile body in position to afford rear vision for the driver or front seat passenger.

In mirrors of this type, a problem of major importance has been to achieve a rugged durable mirror of simple and economical construction which permits an optimum range of adjustability, so that the same mirror assembly will afford an effective rear view whether mounted on either the right or left hand side of the automobile body. In as much as the range of adjustability required for the mirror differs on opposite sides of the automobile body, conventional mirror constructions otherwise suitable for use in the situations indicated have been adapted for mounting on either one side of the automobile or the other. This is particularly true of the usually preferred mirror constructions wherein the ball portion of the ball and socket joint is produced in the form of a boss on the shell by a deep drawing operation, since the adjustability of the mirror face is limited by contact between the back of the shell and the supporting arm or bracket which provides the socket for the ball and socket joint.

Obviously the necessity of fabricating, handling and assembling left and right hand parts of such mirrors separately involves additional expense and inconvenience, so that a simple, economical, yet feasible means for increasing the adjustability of such mirrors, whereby a single construction may be used interchangeably on either the right or left hand side of the vehicle body, has been highly desired.

A primary object of the present invention has been to provide an improved mounting for an exterior rear view mirror assembly of the foregoing character and having a materially increased range of adjustability over conventional structures.

Another object is to provide such a rear view mirror assembly for automobile bodies which affords sufficient adjustability on its mounting to permit its use with optimum efficiency and feasibility at either side of the automobile body.

Another object is to provide an improved ball and socket type adjustable coupling between the conventional exterior rear view mirror head and supporting arm or bracket whereby a simple, rugged and durable assembly of economical construction affording optimum adjustability is achieved.

Another and more specific object of the present invention is to provide an improved coupling of the foregoing character which is particularly adapted to be adjustably connected between the formed rounded boss on the back of the shell of a conventional mirror head and the rounded socket in the outer end of a supporting arm or bracket for the head, so as to complete a ball and socket type juncture between the head and bracket having a superior range of adjustability.

Other objects of this invention will appear in the following description and appended claims, reference being had to the accompanying drawings forming a part of this specification wherein like reference characters designate corresponding parts in the several views.

The above and other objects are accomplished in a preferred embodiment of the present invention comprising a mirror head including a sheet metal shell or backing within which a silvered mirror glass or other reflecting surface is secured. A spherical hollow boss is formed on the back side of the shell to comprise one element of a ball and socket joint. A supporting arm or bracket for the head is adapted at one end for attachment exteriorly to the side of a motor vehicle body and is provided with a spherical socket in its outer end to comprise one element of a second ball and socket joint. Interposed between the bracket and head is an intermediate spherical concavo-convex coupling element having a spherical convex face adjustably seated within the spherical socket of the bracket and adjustably receiving the spherical boss of the shell within its spherical concave face, thereby completing a ball and socket joint with both the supporting bracket and the shell of the head.

Suitable means are provided for holding the cooperating ball and socket elements in operative engagement with each other. By way of example in a preferred embodiment of the present invention, a bolt having an enlarged head within the interior of the hollow boss of the shell projects through aligned apertures located centrally within the boss and intermediate coupling element and is screw threaded into the supporting bracket at the central region of the spherical socket. The aligned apertures in the boss and intermediate coupling member are preferably over-size with respect to the diameter of the bolt shank to permit the desired adjustability between the ball and socket elements. The interior surface of the hollow spherical boss is also preferably spherical and comprises a seat for the convex surface of a spherical cup washer located within the interior of the boss around the bolt shank. Tensioned resilient means, such as a coil spring around the bolt shank and interposed under compression between the washer and bolt head for resiliently forcing the adjustable ball and socket elements snugly together in operative friction engagement with each other, are provided for frictionally holding the mirror head in its adjusted position while at the same time permitting its ready adjustability upon the application of sufficient force to overcome the friction contact or engagement between the adjacent ball and socket elements effected by the resilient means.

From the foregoing, it is clear that the elements described comprise a double ball and socket joint which readily permits one range of adjustability between the intermediate coupling element and the supporting arm or bracket and also permits a second range of adjustability between the intermediate coupling member and the spherical boss of the head. Accordingly, the intermediate coupling element affords a greater range of adjustability than would otherwise be possible. Obviously more than one intermediate coupling element may be provided in series with each other where a still greater range of adjustability is required.

Details of a preferred embodiment of the present invention are illustrated by way of example in the drawings wherein:

Fig. 1 is a fragmentary side elevation of an automobile body, showing mounted thereon an exterior rear view mirror assembly constructed in accordance with the present invention.

Fig. 2 is a fragmentary horizontal median section through the mirror head and ball and socket coupling elements of the present invention.

Fig. 3 is a fragmentary section similar to Fig. 2, but showing the ball and socket joint elements in a different position of adjustment.

Fig. 4 is a fragmentary exploded section through the socket end of the supporting bracket, the intermediate coupling element, and the cup washer, as shown in Figs. 2 and 3 but prior to assembly.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

With respect to the embodiment of the invention illustrated herein by way of example, a fragmentary portion of an automobile body 10 having a mirror assembly, indicated generally by the numeral 12, mounted thereon is shown in Fig. 1. Referring particularly to Figs. 2, 3 and 4, the shell 14 of the mirror head is adjustably connected by a ball and socket joint described in detail hereinafter to the outer end of a supporting arm or bracket 16, which in turn is provided at its inner end with means not shown for attachment exteriorly to the body 10 at a forward position to permit rear vision by the driver or front seat passenger.

The shell 14 is preferably formed by a drawing operation from sheet metal to comprise a generally convex exterior backing for the head and having a hollow spherical projection or rounded boss 18 comprising the ball portion of a ball and socket joint. In the present instance, the shell 14 is also provided with an annular inturned flange 14a formed over the chamfered annular edge of a mirror glass 19 or other suitable reflector. The glass 19 is silvered and protected by a metal backing or frame 19a in accordance with conventional practice. The assembled glass 19 and backing 19a are secured within the outer periphery of the shell 14 by the annular inturned flange 14a.

The boss 18 is centrally apertured at 20 and has a spherical inner surface 22 enclosing a cavity 24. The outer end of the bracket 16 is formed with a spherical cavity or socket 26 which comprises the socket element of a second ball and socket joint. Interposed between the arm 16 and shell 14 is an intermediate concavo-convex coupling element 28 having a spherical convex surface 30 seated within the socket 26 of the bracket 16 and having a spherical concave surface 32 with the rounded boss 18 seated therein. The element 28 is centrally apertured at 34 to permit passage of the shank of a bolt 36 having its threaded end screw threaded into a threaded bore 38 which extends generally perpendicularly into the central portion of the socket 26.

Although it will be apparent that other means may be suitably employed within the spirit of the present invention to hold the cooperating ball and socket joint elements in operative engagement with each other, the joint elements of the particular embodiment shown by way of example are operatively held in relation to each other by the bolt 36 having an enlarged head 40 within the cavity 24 of the boss 18. Around the shank of the bolt 36 and adjacent the head 40 is a spring retaining disc washer 42. Also around the shank of the bolt 36 and seated against the interior spherical surface 22 of the boss 18 is a spherical cup washer 44. Interposed under compression between the washers 42 and 44 is a coil spring 46 provided to hold the seated ball and socket elements of the above described double ball and socket joint firmly together in friction contact with each other. Thus the shell 14 is frictionally held against accidental or undesirable displacement in any adjusted position by virtue of the resiliently urged frictional contact between the boss 18 and concave surface 32 of the intermediate element 28 and between the concave face of the socket 26 and the convex surface 30 of the element 28. Nevertheless, adjustment of the position of the mirror head is readily permitted upon the application of sufficient manual force thereto to overcome the binding or friction force effected by the spring 46.

It is apparent from the structure shown that a primary adjustment of the mirror head is afforded by the ball and socket joint between the element 28 and the boss 18. Thereafter, a secondary adjustment between the intermediate element 28 and the socket 26 may be effected to achieve an even greater range of adjustability than would otherwise be possible by a simple ball and socket coupling between the mirror head and the supporting arm 16, adapting the mirror construction shown for universal employment without alteration on either the right or left hand side of the automobile body. In this connection, the apertures 20 and 34 of the boss 18 and element 28 respectively are sufficiently oversize with respect to the shank of the bolt 36 to permit adequate movement of the ball and socket elements without interference from the said bolt shank. The aperture of the cup washer 44 is likewise sufficiently large to afford freedom of adjusting movement relative to the shank of the bolt 36, but is sufficiently small to retain the spring 46 under compression within the interior of the boss 18.

In the embodiment of the present invention illustrated herein, the convex and concave surfaces 30 and 32 respectively of the element 28 are preferably eccentric with radii of curvature of equal magnitudes. Thus the element 28 may be employed between the boss 18 and socket 26 of existing assemblies with a minimum of alteration of the dies, jigs and fixtures required in the manufacture of such assemblies. Likewise, the surfaces 30 and 32 may be considered to be coaxial because of the symmetry of the element 28 about its central major axis.

Accordingly, the thickness of the element 28 is a maximum at the center and diminishes toward the outer periphery to an annular lip or rim 28b of a desired substantially uniform minimum thickness. In adjustment of the mirror head, the peripheral edge of the lip 28b will engage the adjacent portion of the shell 14 when the boss 18 is rotated to its extreme position of adjustment relative to the element 28. At this position of adjustment, additional adjustment is permitted by exerting pressure on the head to rotate the element 28 to its extreme position of adjustment relative to the bracket 16, whereat the outer marginal edges of the socket 26 engage the base of the lip 28b at its region of merger with the spherical surface 30.

It will be apparent, however, that the axes of symmetry of the surfaces 30 and 32 may be angularly disposed to each other if desired to meet particular requirements. Also, in view of the foregoing, it is clear that more than one intermediate member similar to the element 28 may be employed in a series of ball and socket relationships, with the convex portion of one element seated within the concave portion of the adjacent element to permit even greater adjustment where desired or necessary.

I claim:

1. In an adjustable rear view mirror, a mirror head having a ball-like portion, a supporting bracket for said mirror head, a socket portion on said bracket spaced from the ball-like portion, means interposed between said bracket and mirror head and having a concave socket portion engageable with said ball-like portion and a convex portion engageable within said first-named socket portion, and means for connecting said mirror head and bracket together to provide for relative angular movement of said ball-like portion and means and relative angular movement of said means and first-named socket portion.

2. In an adjustable rear view mirror, a mirror head having a ball-like portion provided with an outer convex surface, a socket member overlying said ball-like portion and having a concave surface in frictional engagement with said convex surface, said member having an outer convex surface, a supporting bracket for said mirror head having a socket portion and provided with a concave surface in frictional engagement with said last-named convex surface, and means for connecting said mirror head and bracket together to provide for relative angular movement between said socket member and ball-like portion and also between said socket member and bracket.

3. In an adjustable rear view mirror, a mirror head having a ball-like portion, a supporting bracket for said mirror head, a socket portion on said bracket spaced from the ball-like portion, means interposed between said bracket and mirror head and having a concave socket portion engageable with said ball-like portion and a convex portion engageable within said first-named socket portion, said means having an opening therein, and means for connecting said mirror head and bracket together to provide for relative angular movement of said ball-like portion and means and relative angular movement of said means and first-named socket portion, said connecting means including an element secured to said bracket and extending through said opening and shiftable angularly therein.

4. In an adjustable rear view mirror, a mirror head having a ball-like portion provided with an outer convex surface, a socket member overlying said ball-like portion and having a concave surface in frictional engagement with said convex surface, said member having an outer convex surface and also having an opening therein, a supporting bracket for said mirror head having a socket portion provided with a concave surface in frictional engagement with said last-named convex surface, and means for connecting said mirror head and bracket together to provide for relative angular movement between said socket member and ball-like portion and also between said socket member and bracket, said means including a connecting element having one end yieldingly mounted within said ball-like portion and the opposite end secured to said bracket, said element extending through and being shiftable angularly within said opening in said member.

5. In an adjustable rear view mirror, a mirror head, a supporting bracket for said mirror head, coupling means between said head and bracket effective in combination therewith to provide a plural ball and socket structure, said coupling means and bracket having cooperating ball and socket portions relatively shiftable angularly, and said coupling means and mirror head having cooperating ball and socket portions relatively shiftable angularly, and means including an element extending through said coupling means for yieldingly and frictionally connecting said bracket, mirror head and coupling means together.

6. In an adjustable rear view mirror, a mirror head, a support for said head, and means including a plurality of ball-like portions and a corresponding plurality of socket portions disposed exteriorly of the head to provide a plural ball and socket structure adjustably connecting the head and support together, each ball-like portion extending within a socket portion and being angularly shiftable therein, and means extending through a plurality of said portions for connecting said head and support together to provide for successive independent angular adjustments of the mirror head corresponding to the number of said ball-like portions.

JAMES W. ANDERSON, Jr.

REFERENCES CITED

The following references are of record in the file of this patent:

UNITED STATES PATENTS

| Number | Name | Date |
|---|---|---|
| 703,899 | Debes | July 1, 1902 |
| 1,446,164 | D'Eyraud | Feb. 20, 1923 |
| 1,455,441 | La Hodny | May 15, 1923 |

FOREIGN PATENTS

| Number | Country | Date |
|---|---|---|
| 512,812 | Great Britain | Sept. 26, 1939 |
| 161,459 | Switzerland | July 1, 1933 |